United States Patent (12)
Seydoux et al.

(10) Patent No.: US 9,134,449 B2
(45) Date of Patent: Sep. 15, 2015

(54) DIRECTIONAL RESISTIVITY MEASUREMENT FOR WELL PLACEMENT AND FORMATION EVALUATION

(75) Inventors: Jean Seydoux, Rio de Janeiro (BR); Dzevat Omeragic, Lexington, MA (US); Dean M. Homan, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 707 days.

(21) Appl. No.: 13/030,780

(22) Filed: Feb. 18, 2011

(65) Prior Publication Data

US 2011/0238312 A1    Sep. 29, 2011

Related U.S. Application Data

(63) Continuation-in-part of application No. 12/434,888, filed on May 4, 2009, now Pat. No. 8,368,403.

(60) Provisional application No. 61/307,327, filed on Feb. 23, 2010.

(51) Int. Cl.
*G01V 3/00* (2006.01)
*G01V 3/22* (2006.01)
(Continued)

(52) U.S. Cl.
CPC .. *G01V 3/22* (2013.01); *G01V 1/52* (2013.01); *G01V 3/30* (2013.01)

(58) Field of Classification Search
CPC .............. G01V 3/22; G01V 3/30; G01V 1/52
USPC .................................................. 324/323–375
See application file for complete search history.

(56) References Cited

U.S. PATENT DOCUMENTS 4,357,660 A    11/1982  Hepp
4,536,714 A     8/1985  Clark
(Continued)

FOREIGN PATENT DOCUMENTS

CN    1064913 A    9/1992
CN    1407350 A    4/2003
(Continued)

OTHER PUBLICATIONS

Extended European Search Report of EP Application Serial No. EP10004420.5 dated Dec. 1, 2011: pp. 1-12.
(Continued)

*Primary Examiner* — Melissa Koval
*Assistant Examiner* — Daniel Miller
(74) *Attorney, Agent, or Firm* — John Vereb; Kimberly Ballew

(57) ABSTRACT

The present disclosure relates to a method to determine a formation property of a subsurface formation. A downhole logging tool having two or more antennas, at least two of the antennas having a transversely-sensitive element and an axially-sensitive element is provided. Azimuthally-sensitive measurements are obtained using the antennas of the downhole logging tool. The measurements are fitted to a Fourier series having Fourier coefficients that include channel gains, if any. A DC component, a first harmonic component, and a second harmonic component are determined from the Fourier series, a measurement type is determined using the DC component, the first harmonic component, and/or the second harmonic component, and the formation property of the subsurface formation is determined using the determined measurement type.

18 Claims, 15 Drawing Sheets

(51) Int. Cl.
*G01V 3/30* (2006.01)
*G01V 1/52* (2006.01)

(56) References Cited

U.S. PATENT DOCUMENTS

| | | |
|---|---|---|
| 4,675,611 A | 6/1987 | Chapman et al. |
| 4,899,112 A | 2/1990 | Clark et al. |
| 4,901,069 A | 2/1990 | Veneruso |
| 6,008,646 A | 12/1999 | Griffin et al. |
| 6,181,138 B1 | 1/2001 | Hagiwara et al. |
| 6,304,086 B1 | 10/2001 | Minerbo et al. |
| 6,373,248 B1 | 4/2002 | Poitzsch et al. |
| 6,566,881 B2 | 5/2003 | Omeragic et al. |
| 6,788,065 B1 | 9/2004 | Homan et al. |
| 7,038,457 B2 | 5/2006 | Chen et al. |
| 7,093,672 B2 | 8/2006 | Seydoux et al. |
| 7,239,145 B2 | 7/2007 | Homan et al. |
| 8,368,403 B2 | 2/2013 | Homan et al. |
| 2003/0155923 A1 | 8/2003 | Omeragic et al. |
| 2003/0184304 A1 | 10/2003 | Homan et al. |
| 2004/0059515 A1 | 3/2004 | Kennedy |
| 2004/0061622 A1 | 4/2004 | Clark |
| 2004/0113609 A1 | 6/2004 | Homan et al. |
| 2006/0145700 A1* | 7/2006 | Tabanou et al. ............... 324/347 |
| 2006/0235618 A1 | 10/2006 | Wu et al. |
| 2007/0137854 A1 | 6/2007 | Homan et al. |
| 2007/0236221 A1 | 10/2007 | Merchant et al. |
| 2007/0247330 A1 | 10/2007 | Clark |
| 2008/0074336 A1 | 3/2008 | Signorelli et al. |
| 2008/0136419 A1* | 6/2008 | Seydoux et al. ............... 324/333 |
| 2008/0143336 A1* | 6/2008 | Legendre et al. ............. 324/339 |
| 2008/0224707 A1 | 9/2008 | Wisler et al. |
| 2011/0238312 A1 | 9/2011 | Seydoux et al. |

FOREIGN PATENT DOCUMENTS

| | | |
|---|---|---|
| EP | 0552087 A2 | 7/1993 |
| EP | 1321780 A1 | 6/2003 |
| EP | 1158138 A2 | 11/2011 |
| GB | 2290385 A | 12/1995 |
| GB | 2374936 A | 10/2002 |
| GB | 2404732 A | 2/2005 |
| WO | 03025342 A2 | 3/2003 |

OTHER PUBLICATIONS

International Preliminary Report on Patentability of PCT Application Serial No. PCT/US2011/034126 dated Nov. 8, 2012: pp. 1-6.
Office Action issued in Chinese Chinese Application No. 201010170063.3 on Apr. 28, 2014, 4 pages.
Office Action issued in Chinese Chinese Application No. 201010170063.3 on Aug. 2, 2013, 9 pages.
Office Action issued in Chinese Application No. 201010170063.3 on Dec. 19, 2013, 7 pages.
Examination Report issued in European Application No. 10004420.5 on Dec. 19, 2013, 7 pages.
Office Action issued in Mexican Application No. MX/A/2010/004656 on May 28, 2014, 2 pages.

* cited by examiner

DIRECTIONAL RESISTIVITY MEASUREMENT FOR WELL PLACEMENT AND FORMATION EVALUATION

CROSS-REFERENCE TO OTHER APPLICATIONS

This application claims, under 35 U.S.C. 119(e), priority to and the benefit of U.S. Provisional Application No. 61/307,327, filed Feb. 23, 2010 now U.S. Pat. No. 8,368,403. This application is, under 35 U.S.C. 120, a continuation-in-part application of co-pending U.S. application Ser. No. 12/434,888, filed May 4, 2009.

BACKGROUND

1. Technical Field

The present disclosure relates generally to the logging of subsurface formations surrounding a wellbore using a downhole logging tool, and particularly to making directional measurements for well placement and formation evaluation.

2. Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. MWD tools typically provide drilling parameter information such as weight on the bit, torque, temperature, pressure, direction, and inclination. LWD tools typically provide formation evaluation measurements such as resistivity, porosity, and NMR distributions. MWD and LWD tools often have components common to wireline tools (e.g., transmitting and receiving antennas), but MWD and LWD tools must be constructed to not only endure but to operate in the harsh environment of drilling.

In one manner of making deep LWD electromagnetic measurements, triaxial antennas carried on a transmitter sub are used in conjunction with a directional receiver (carried on a receiver sub). The relative azimuthal angle between the sub containing the transmitters and the sub containing the receiver usually cannot be controlled when the two subs are made up. Thus, the azimuthal offset between the transmitter and receiver antennas is not normally known. Also, due to technical limitations, the triaxial antennas are not co-located. Such is the current design for tools used in the LWD environment to make deep directional electromagnetic measurements for well placement and electromagnetic look-ahead applications.

SUMMARY

The present disclosure relates to a method to determine a formation property of a subsurface formation. A downhole logging tool having two or more antennas, at least two of the antennas having a transversely-sensitive element and an axially-sensitive element is provided. Azimuthally-sensitive measurements are obtained using the antennas of the downhole logging tool. The measurements are fitted to a Fourier series having Fourier coefficients that include channel gains, if any. A DC component, a first harmonic component, and a second harmonic component are determined from the Fourier series, a measurement type is determined using the DC component, the first harmonic component, and/or the second harmonic component, and the formation property of the subsurface formation is determined using the determined measurement type.

Other aspects and advantages will become apparent from the following description and the attached claims.

DETAILED DESCRIPTION

Some embodiments will now be described with reference to the figures. Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
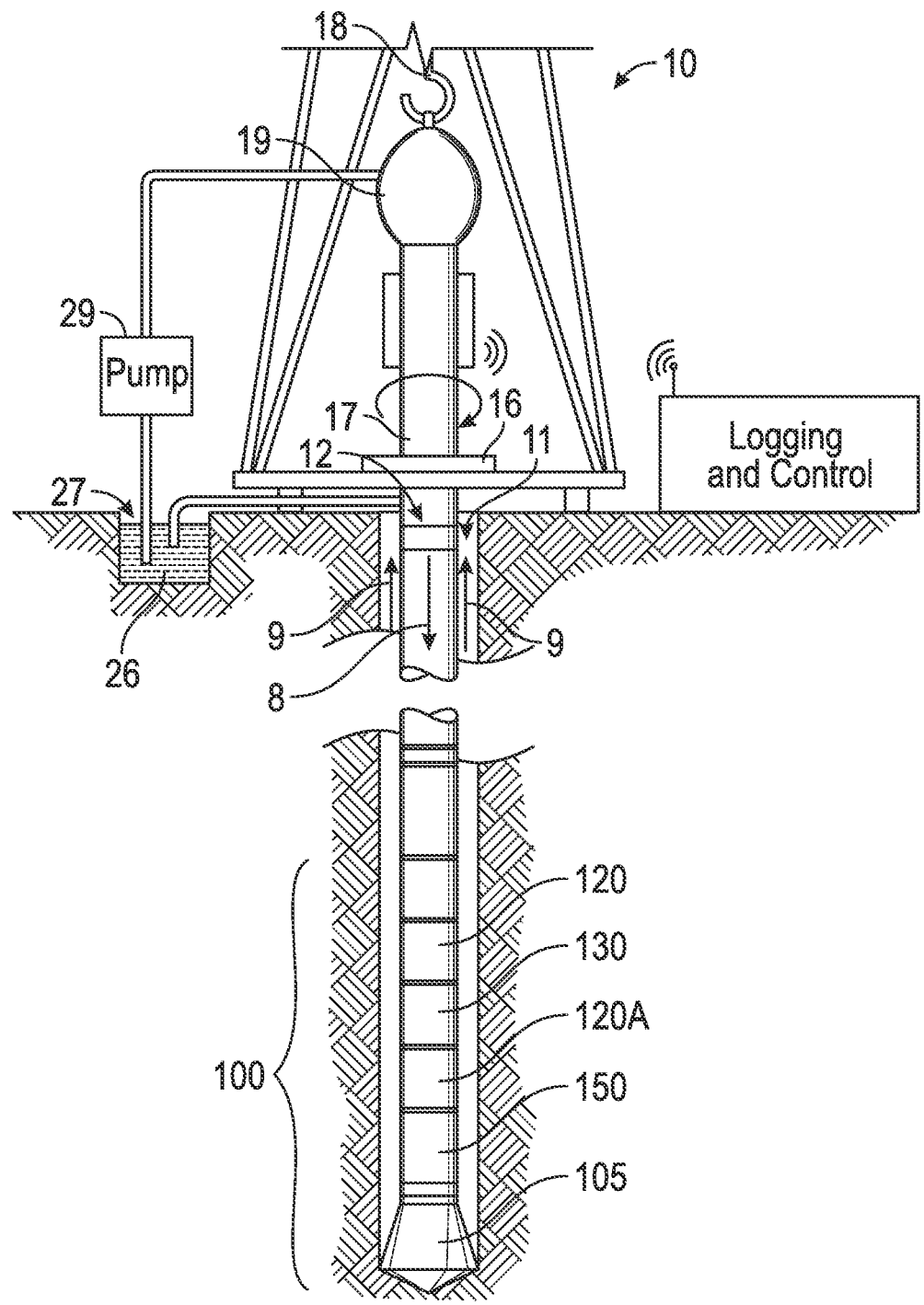
FIG. 1 illustrates an exemplary well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor 150, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Figure 2:
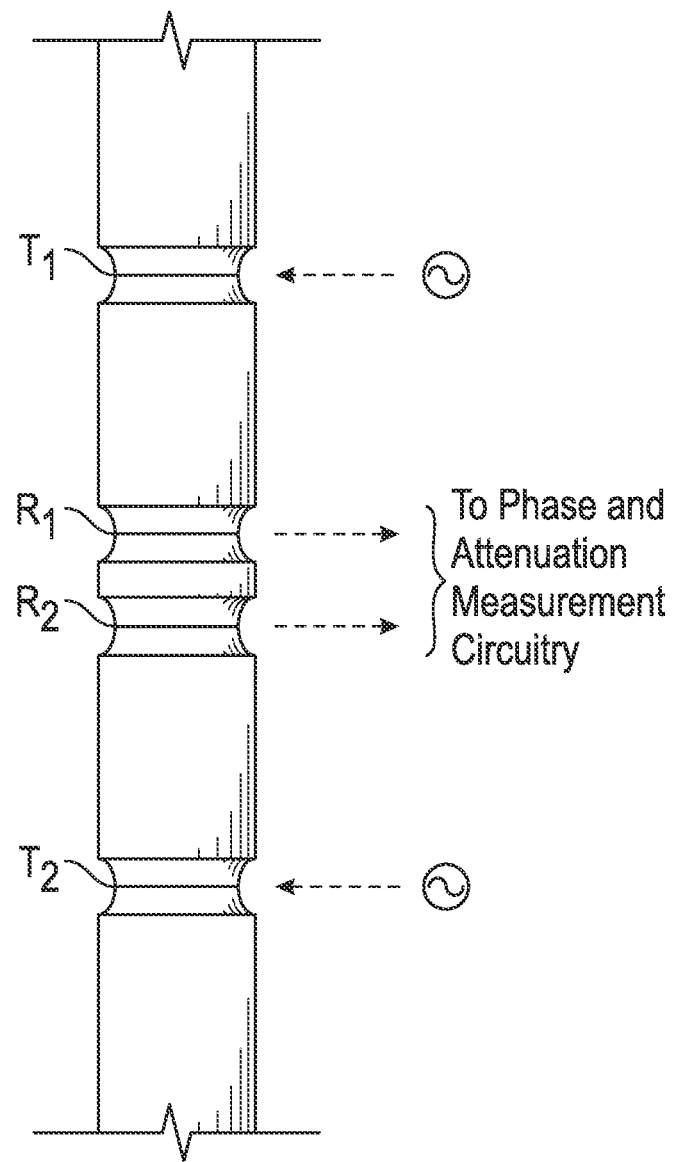
FIG. 2 shows a prior art electromagnetic logging tool.

An example of a tool which can be the LWD tool 120, or can be a part of an LWD tool suite 120A, is shown in FIG. 2. As seen in FIG. 2, upper and lower transmitting antennas, $T_1$ and $T_2$, have upper and lower receiving antennas, $R_1$ and $R_2$, therebetween. The antennas are formed in recesses in a modified drill collar and mounted in insulating material. The phase shift of electromagnetic energy as between the receivers provides an indication of formation resistivity at a relatively shallow depth of investigation, and the attenuation of electromagnetic energy as between the receivers provides an indication of formation resistivity at a relatively deep depth of investigation. U.S. Pat. No. 4,899,112 can be referred to for further details. In operation, attenuation-representative signals and phase-representative signals are coupled to a processor, an output of which is coupleable to a telemetry circuit.

Recent electromagnetic logging tools use one or more tilted or transverse antennas, with or without axial antennas.

Those antennas may be transmitters or receivers. A tilted antenna is one whose dipole moment is neither parallel nor perpendicular to the longitudinal axis of the tool. A transverse antenna is one whose dipole moment is substantially perpendicular to the longitudinal axis of the tool, and an axial antenna is one whose dipole moment is substantially parallel to the longitudinal axis of the tool. A triaxial antenna is one in which three antennas (i.e., antenna coils) are arranged to be mutually independent. That is, the dipole moment of any one of the antennas does not lie in the plane formed by the dipole moments of the other two antennas. Three orthogonal antennas, with one antenna axial and the other two transverse, is one example of a triaxial antenna. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

Figure 3:
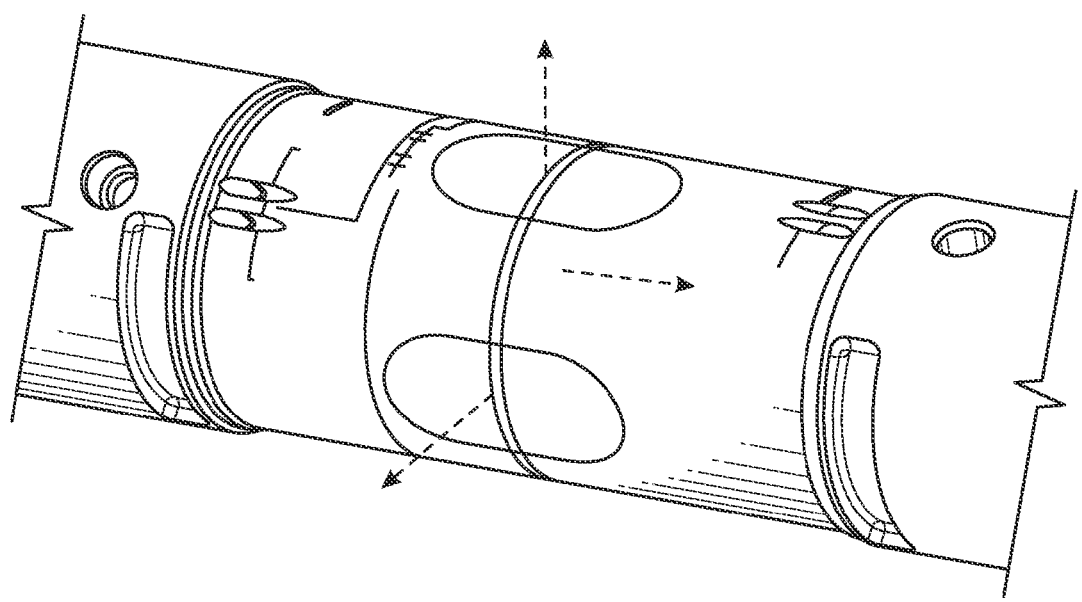
FIG. 3 schematically shows antennas of an exemplary resistivity logging tool having co-located antennas with two saddle coil antennas and an axial coil antenna, in accordance with the present disclosure.
Figure 4:
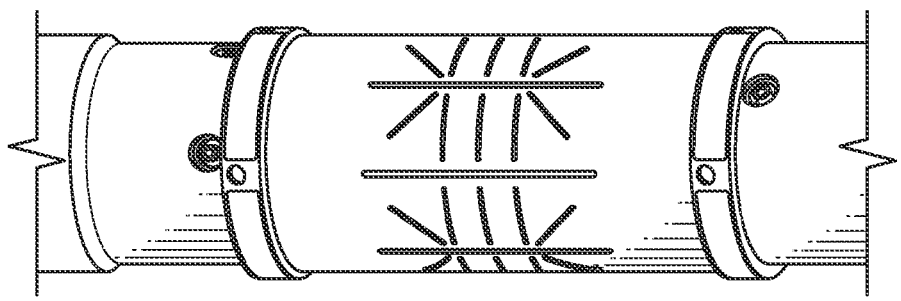
FIG. 4 schematically shows a shield design for a co-located axial and dual transverse coil antenna, in accordance with the present disclosure.

One possible antenna design includes axial and transverse antennas. The axial antennas are wound along the axis of the logging tool and produce a radiation pattern that is equivalent to a dipole along the axis of the tool (z direction). The transverse antennas are of saddle coil design, for example, as shown in FIG. 3. The transverse antennas generate a radiation pattern that is equivalent to a dipole that is perpendicular to the axis of the tool (x or y direction). The saddle coil design of the transverse antennas can be made by winding wires on the cylindrical surface of the logging tool as shown in the drawing and can include either one coil or two coils wound on the opposite sides of the tool surface.

The transverse antennas can be made using individual wires or the pattern of wires can be made on a flexible printed circuit using printed circuit technology with traces of copper, silver, or other conductive material. The printed circuits can then be wrapped around the tool surface/antenna recess at the desired orientation as described in U.S. Pat. No. 6,690,170, the disclosure of which is incorporated herein by reference. Multiple saddle coils can be made using this technology on the same or different printed circuits for different orientations (e.g., x, y, or any other direction). The saddle-coils can also be melt-bonded into a thermal plastic or inlayed into mechanically cut grooves.

In some applications, one may wish to surround the antennas with a shield that provides mechanical protection while allowing electromagnetic radiation to be transmitted or received with minimum attenuation. The shield can be a metallic cylinder with slots cut so as to be perpendicular to the wire (or printed circuit traces) to provide for the desired electromagnetic transparency. This design is shown in Figure for a triaxial implementation, wherein triaxial refers to an axial (z directed) antenna and two transverse (x and y) antennas. Note that the antennas do not have to be collocated. Alternatively, the shield can be a non-conductive cylinder with embedded metallic sections.

In some applications one may want to use the transverse and axial antennas in series (i.e., excite them at the same time). In those cases the amount of electric power going into the different antennas and the relative phases can be varied to synthesize antenna patterns in desired directions. For example, equal excitation and phase of two orthogonal antennas generates an antenna pattern equivalent to that of a 45-degree tilted antenna. Other angular orientations can be achieved with a bi-axial antenna set if each antenna is energized with a different percentage of the total current.

The saddle coil design is not limited to X and Y orientations. In fact, a design with more than four saddle coils can be constructed, each saddle coil being azimuthally distributed around the circumference of the collar (tool structural member). In that case, the shield would correspond to a pattern of slots resembling stars distributed in a manner similar to the coils. For the case of six evenly distributed coils (i.e., every 60 degrees), there would be generated three transverse antennas distributed azimuthally 120 degrees apart. Similarly, with eight evenly distributed coils (i.e., every 45 degrees), there would be produced four transverse antennas, two of which may be aligned along the axes while the other two are aligned between the axes.

Figure 5:
FIG. 5 is a magnetic dipole representation of an exemplary embodiment of a single transmitter, single receiver, two-antenna group, in accordance with the present disclosure.

An exemplary two antenna group configuration is shown in FIG. 5 with T1X and R1X as transverse saddle coils and T1Z and R1Z as standard axial coils. Each of the transmitter antenna group or receiver antenna group is an XZ group. However, it is clear that the group can be a YZ or XY group. Keeping the same angle between antennas, the axial coils will provide the standard ZZ coupling measurement while the transverse coils will provide the transverse (XX) measurement. The co-located transmitter and receiver antennas can also be wired in series to become a single tilted antenna (T1XZ and R1XZ).

For an LWD tool rotating in a drilling environment, the voltage measurements as a function of the tool orientation (toolface) of the single transmitter-receiver antenna pairs can be expressed as functions of the elementary couplings as follows. Note, the transverse voltage DC component is directly proportional to (XX+YY)/2.

$$V(T_i^Z, R_j^Z) = GT_i^Z \cdot GR_j^Z \cdot ZZ_{ij} = V(T_i^Z, R_j^Z)^0$$

$$V(T_i^X, R_j^X) = GT_i^X \cdot GR_j^X \cdot \left( \begin{array}{c} \frac{XX_{ij}+YY_{ij}}{2} + \frac{XX_{ij}-YY_{ij}}{2} \cdot \\ \cos 2\varphi + \frac{XY_{ij}+YX_{ij}}{2}\sin 2\varphi \end{array} \right) =$$

$$V(T_i^X, R_j^X)^0 + V(T_i^X, R_j^X)^2 \cdot \cos(2\varphi + \varphi_0)$$

$$V(T_i^Z, R_j^X) = GT_i^Z \cdot GR_j^X \cdot (\cos\varphi \cdot ZX_{ij} + \sin\varphi \cdot ZY_{ij}) =$$

$$V(T_i^Z, R_j^X)^1 \cdot \cos(\varphi + \varphi_0)$$

$$V(T_i^X, R_j^Z) = GT_i^X \cdot GR_j^Z \cdot (\cos\varphi \cdot XZ_{ij} + \sin\varphi \cdot YZ_{ij}) =$$

$$V(T_i^X, R_j^Z)^1 \cdot \cos(\varphi + \varphi_0)$$

where $GT_{i,j}^{X,Z}$ and $GR_{i,j}^{X,Z}$ are the channel complex gains for transmitter and receiver, $\varphi$ is the tool orientation, $\varphi_0$ is the directional angle, and $V(T_i^{Z,X}, R_j^{Z,X})^{0,1,2}$ is the DC, first harmonic, and second harmonic component from fitting.

Those formulas express the relationship between the elementary couplings and the single pair voltage measurements (amplitude and phase). The formulas also contain the channel gains that include electronics gain and antenna effective areas. When the gains of the individual channels are known (measured or estimated), all elementary couplings can be solved for. Having solved for the elementary couplings, ratios of elementary couplings as described in the table below can be measured. That is, ratios of elementary coupling with enhanced sensitivity to specific formation characteristics such as anisotropy or dip can be computed. The ratios in Table 1 are shown with their gain dependence.

TABLE 1

| Measurement type | Definition | Generation |
|---|---|---|
| Symmetrized Directional | $\dfrac{ZZ-ZX}{ZZ+ZX} \cdot \dfrac{ZZ+XZ}{ZZ-XZ}$ | $\dfrac{V(T_i^Z, R_j^Z)^0 - V(T_i^Z, R_j^X)^1 \cdot GR_j^Z/GR_j^X}{V(T_i^Z, R_j^Z)^0 + V(T_i^Z, R_j^X)^1 \cdot GR_j^Z/GR_j^X} \cdot \dfrac{V(T_i^Z, R_j^Z)^0 + V(T_i^X, R_j^Z)^1 \cdot GT_i^Z/GT_i^X}{V(T_i^Z, R_j^Z)^0 - V(T_i^X, R_j^Z)^1 \cdot GT_i^Z/GT_i^X}$ |
| Anti-Symmetrized Directional | $\dfrac{ZZ-ZX}{ZZ+ZX} \cdot \dfrac{ZZ-XZ}{ZZ+XZ}$ | $\dfrac{V(T_i^Z, R_j^Z)^0 - V(T_i^Z, R_j^X)^1 \cdot GR_j^Z/GR_j^X}{V(T_i^Z, R_j^Z)^0 + V(T_i^Z, R_j^X)^1 \cdot GR_j^Z/GR_j^X} \cdot \dfrac{V(T_i^Z, R_j^Z)^0 - V(T_i^X, R_j^Z)^1 \cdot GT_i^Z/GT_i^X}{V(T_i^Z, R_j^Z)^0 + V(T_i^X, R_j^Z)^1 \cdot GT_i^Z/GT_i^X}$ |
| Resistivity Harmonic | $\dfrac{2ZZ}{XX+YY}$ | $\dfrac{V(T_i^Z, R_j^Z)^0 \cdot GT_i^X \cdot GR_j^X}{V(T_i^X, R_j^X)^0 \cdot GT_i^Z \cdot GR_j^Z}$ |
| Resistivity Anisotropy | $\dfrac{XX}{YY}$ | $\dfrac{V(T_i^X, R_j^X)^0 + V(T_i^X, R_j^X)^2}{V(T_i^X, R_j^X)^0 - V(T_i^X, R_j^X)^2}$ |

For the above measurement types, only the resistivity anisotropy channel does not require gain ratio measurements between the transverse and axial antennas. All other measurement types require the transmitter and receiver ratio measurements. To measure these ratios, at least one of three options may be considered. A third single test loop antenna tilted at 45 degrees may be added to the dual antenna. To measure the receiver ratio, each channel is processed using this test loop as a "mini" transmitter. For the transmitter ratio, this test loop acts as a "mini" receiver. The test loop procedure can be either performed at the time of the signal voltage measurements or as a calibration procedure before the LWD tool embodiment is used downhole.

Alternatively, a calibration signal that characterizes both receiver channels, but not the variations of moment direction (geometry) due to the antenna, may be used. Those variations need to be measured and need to be negligible with respect to the measurement specifications. The current passing through the TX antennas can be measured using a common electronic circuit, but, again, antenna variation needs to be characterized.

A third option is to use an external tilted test loop as a standard that can be used to excite a tool response and can also be modeled. The ratio of the calculated measured response to the tilted test loop can be used as a gain correction. See, for example, U.S. Pat. No. 7,414,391, the disclosure of which is incorporated herein by reference.

Figure 6:
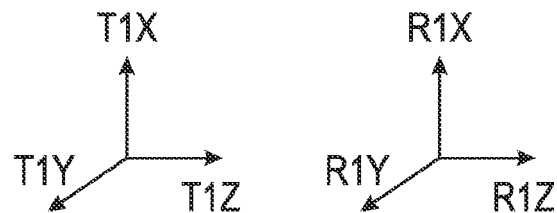
FIG. 6 is a magnetic dipole representation of an alternate exemplary embodiment of a single transmitter, single receiver, two-antenna group, in accordance with the present disclosure.

A further exemplary embodiment of a two antenna group configuration is shown in FIG. 6 with T1X, T1Y, R1X, and R1Y as transverse saddle coils and T1Z and R1Z as standard axial coils. Keeping the same angle between antennas, the axial coils will provide the standard ZZ coupling measurement, while the transverse coils will provide the transverse (XX) and (YY) measurements. In this embodiment, the elementary couplings can be measured directly, without the need for tool rotation, Such a system is able to provide measurements while sliding. The ability to provide such measurements while sliding is important when positive displacement motors are used. In this embodiment, the gain of the individual channels is preferably measured or estimated though calibration using a combination of standard techniques such as test loops, temperature characterization, and electronics channel calibrations.

Figure 7:
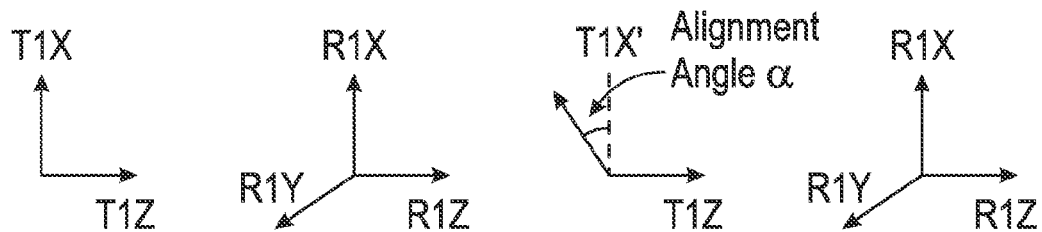
FIG. 7 is a magnetic dipole representation of an alternate exemplary embodiment of a single transmitter, single receiver, two-antenna group, in accordance with the present disclosure.

A single transmitter-receiver group is not limited to an XZ antenna configuration. A configuration such as that shown in FIG. 7 can also be used. This embodiment includes a single transmitter, single receiver configuration with X,Z transmitter coils, X,Y transverse receiver coils, and a Z receiver coil. On the right, the transmitter group is shown oriented azimuthally with respect to the receiver group by an alignment angle $\alpha$. In the case of each antenna group residing on separate (modular) LWD collars, one group may be oriented (azimuthally) differently with respect to the other group determined by an alignment angle. In this specific case the dependence of the measured complex voltage with respect to the elementary couplings are as follows.

$$V(T_i^Z, R_j^Z) = GT_i^Z \cdot GR_j^Z \cdot ZZ_{ij} = V(T_i^Z, R_j^Z)^0$$

$$V(T_i^{X'}, R_j^X) = GT_i^X \cdot GR_j^X \cdot \left( \cos\alpha \cdot \frac{XX_{ij}+YY_{ij}}{2} - \sin\alpha \cdot \frac{XY_{ij}+YX_{ij}}{2} + \frac{XX_{ij}-YY_{ij}}{2} \cdot \cos 2\varphi + \frac{XY_{ij}+YX_{ij}}{2} \sin 2\varphi \right) =$$

$$V(T_i^X, R_j^X)^0 + V(T_i^X, R_j^X)^2 \cdot \cos(2\varphi + \varphi_0)$$

$$V(T_i^Z, R_j^X) = GT_i^Z \cdot GR_j^X \cdot (\cos\varphi \cdot ZX_{ij} + \sin\varphi \cdot ZY_{ij}) =$$

$$V(T_i^Z, R_j^X)^1 \cdot \cos(\varphi + \varphi_0)$$

$$V(T_i^X, R_j^Z) = GT_i^X \cdot GR_j^Z \cdot (\cos\varphi \cdot XZ_{ij} + \sin\varphi \cdot YZ_{ij}) =$$

$$V(T_i^X, R_j^Z)^1 \cdot \cos(\varphi + \varphi_0)$$

where $GT_{i,j}^{X,Z}$ and $GR_{i,j}^{X,Z}$ are the channel complex gains for transmitter and receiver, $\varphi$ is the tool orientation, $\varphi_0$ is the directional angle, and $V(T_i^{Z,X}, R_j^{Z,X})^{0,1,2}$ is the DC, first harmonic, and second harmonic component from fitting.

In this case, the rotation of the tool can be used to extract the alignment angle. If there is no rotation, the alignment angle will need to be measured.

Figure 8:
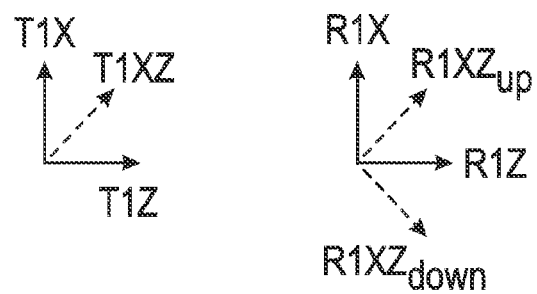
FIG. 8 is a magnetic dipole representation of an alternate exemplary embodiment of a single transmitter, single receiver, two-antenna group having tilted antennas, in accordance with the present disclosure.
Figure 9:
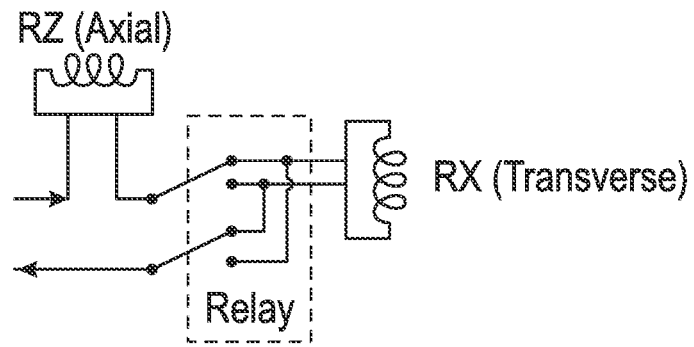
FIG. 9 is a diagram of series-wired transverse and axial coils, in accordance with the present disclosure. A double throw, double switch relay allows switching the direction of the combined coil magnetic moment azimuthally by 180 degrees.
Figure 10:
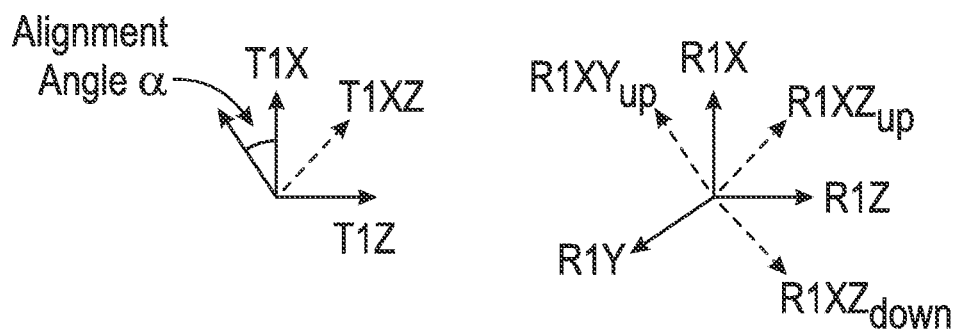
FIG. 10 is a magnetic dipole representation of an alternate exemplary embodiment of a single transmitter, single receiver, two-antenna group having tilted antennas, in accordance with the present disclosure.

The transmitter and receiver dual antennas can also be used in series and act as a tilted antenna at any direction, as shown in FIG. 8. A single transmitter and receiver group can have their antennas combined (hardware or software) in series to yield any desired direction. The combination can also extend to a 3 coil system (XYZ) where YZ or XY could also be combined in series. A hardware implementation for a 45 degree tilted antenna would require that both X and Z magnetic moments be of same amplitude (i.e., the ratio of number of turns between antennas needs to be determined to achieve a desired orientation). Also, the receiver dual antennas can be wired in reverse series to yield a tilted moment with 180 degree azimuthal rotation, as represented by $R1XZ_{down}$ (see FIGS. 8 and 9). The received voltages can be expressed as follows for tilted antennas in series.

$$V(T_i^{XZ}, R_j^{XZ}) = GT_i^{XZ} \cdot GR_j^{XZ} \cdot$$

$$\left(ZZ_{ij} + \frac{XX_{ij} + YY_{ij}}{2} + \cos\varphi \cdot (ZX_{ij} + XZ_{ij}) + \sin\varphi \cdot (ZY_{ij} + YZ_{ij}) + \frac{XX_{ij} + YY_{ij}}{2} \cdot \cos2\varphi + \frac{XY_{ij} + YX_{ij}}{2}\sin2\varphi\right)$$

$$V(T_i^{XZ}, R_j^{XZdown}) = GT_i^{XZ} \cdot GR_j^{XZ} \cdot$$

$$\left(ZZ_{ij} - \frac{XX_{ij} + YY_{ij}}{2} + \cos\varphi \cdot (ZX_{ij} - XZ_{ij}) + \sin\varphi \cdot (ZY_{ij-} + YZ_{ij}) - \frac{XX_{ij} - YY_{ij}}{2} \cdot \cos2\varphi - \frac{XY_{ij} + YX_{ij}}{2}\sin2\varphi\right)$$

where $GT_i^{XZ}$ is the channel complex gain and $\varphi$ is the tool orientation With this antenna pair combination, all couplings are available (rotation is required) and will not require any calibrations. The formulas for the measurement generation are shown in the Table 2. As a note, the channel gains for TX and RCV do not include any possible variation related to the direction of the antenna magnetic moment due to temperature and pressure. A characterization is needed to validate these effect, but these effects are expected to be negligible.

Similarly, in the case of an XYZ configuration and with different combinations of XZ and YZ in series and an alignment angle $\alpha$, the following formulas involving combinations of $R1XZ_{up}$ and $R1XZ_{down}$ can be used to get the ZZ coupling by addition of both measurements (DC term) and to get the (XX+YY)/2 and (XY−YX)/2 terms weighted by $\cos\alpha$ and $\sin\alpha$ by subtraction of both measurements. Note that the alignment angle can be determined from the measurements using the DC term if two other measurements are used (for example $R1XY_{left}$ and $R1XY_{right}$), allowing solving for angle $\alpha$, ZZ, (XX+YY)/2 and (XY−YX)/2 from four equations.

$$V_{R1XZup} = ZZ + \frac{XX+YY}{2}\cos(\alpha) + \frac{XY-YX}{2}\sin(\alpha) +$$
$$ZX\cos(\phi) + ZY\sin(\phi) + XZ\cos(\alpha+\phi) + YZ\sin(\alpha+\phi) +$$
$$\frac{XX+YY}{2}\cos(\alpha+2\phi) + \frac{XY+YX}{2}\sin(\alpha+2\phi)$$

$$V_{R1XZdown} = ZZ - \frac{XX+YY}{2}\cos(\alpha) - \frac{XY-YX}{2}\sin(\alpha) -$$
$$ZX\cos(\phi) - ZY\sin(\phi) + XZ\cos(\alpha+\phi) + YZ\sin(\alpha+\phi) -$$
$$\frac{XX-YY}{2}\cos(\alpha+2\phi) - \frac{XY+YX}{2}\sin(\alpha+2\phi)$$

Figure 11:
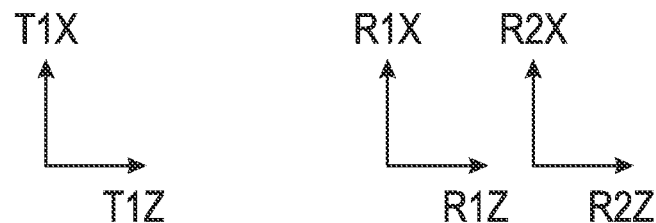
FIG. 11 is a magnetic dipole representation of an alternate exemplary embodiment of a single transmitter, two receiver, three-antenna group, in accordance with the present disclosure.

A three antenna group configuration is shown in FIG. 11 with T1X, R1X, and R2X as saddle transverse coils and T1Z, R1Z, and R2Z as standard axial coils. Each of the transmitter antenna group or receiver antenna group is an XZ. However, it is clear that the group can alternatively be a YZ or XY. Keeping the same angle between antennas, the axial coils will provide the standard ZZ propagation measurement while the

TABLE 2

| Measurement type | Definition | Generation |
|---|---|---|
| Symmetrized Directional | $\frac{ZZ-ZX}{ZZ+ZX} \cdot \frac{ZZ+XZ}{ZZ-XZ}$ | $\frac{V(T_i^{XZ}, R_j^{XZ})^0 + V(T_i^{XZ}, R_j^{XZdown}) - \left(V(T_i^{XZ}, R_j^{XZ})^1 + V(T_i^{XZ}, R_j^{XZdown})^1\right)}{V(T_i^{XZ}, R_j^{XZ})^0 + V(T_i^{XZ}, R_j^{XZdown}) + \left(V(T_i^{XZ}, R_j^{XZ})^1 + V(T_i^{XZ}, R_j^{XZdown})^1\right)} \cdot$ $\frac{V(T_i^{XZ}, R_j^{XZ})^0 + V(T_i^{XZ}, R_j^{XZdown}) + \left(V(T_i^{XZ}, R_j^{XZ})^1 - V(T_i^{XZ}, R_j^{XZdown})^1\right)}{V(T_i^{XZ}, R_j^{XZ})^0 + V(T_i^{XZ}, R_j^{XZdown}) - \left(V(T_i^{XZ}, R_j^{XZ})^1 - V(T_i^{XZ}, R_j^{XZdown})^1\right)}$ |
| Anti-Symmetrized Directional | $\frac{ZZ-ZX}{ZZ+ZX} \cdot \frac{ZZ-XZ}{ZZ+XZ}$ | $\frac{V(T_i^{XZ}, R_j^{XZ})^0 + V(T_i^{XZ}, R_j^{XZdown}) - \left(V(T_i^{XZ}, R_j^{XZ})^1 + V(T_i^{XZ}, R_j^{XZdown})^1\right)}{V(T_i^{XZ}, R_j^{XZ})^0 + V(T_i^{XZ}, R_j^{XZdown}) + \left(V(T_i^{XZ}, R_j^{XZ})^1 + V(T_i^{XZ}, R_j^{XZdown})^1\right)} \cdot$ $\frac{V(T_i^{XZ}, R_j^{XZ})^0 + V(T_i^{XZ}, R_j^{XZdown}) - \left(V(T_i^{XZ}, R_j^{XZ})^1 - V(T_i^{XZ}, R_j^{XZdown})^1\right)}{V(T_i^{XZ}, R_j^{XZ})^0 + V(T_i^{XZ}, R_j^{XZdown}) + \left(V(T_i^{XZ}, R_j^{XZ})^1 - V(T_i^{XZ}, R_j^{XZdown})^1\right)}$ |
| Resistivity Harmonic | $\frac{2ZZ}{XX+YY}$ | $\frac{V(T_i^{XZ}, R_j^{XZ})^0 + V(T_i^{XZ}, R_j^{XZdown})^0}{V(T_i^{XZ}, R_j^{XZ})^0 - V(T_i^{XZ}, R_j^{XZdown})^0}$ |
| Resistivity Anisotropy | $\frac{XX}{YY}$ | $\frac{V(T_i^{XZ}, R_j^{XZ})^0 - V(T_i^{XZ}, R_j^{XZdown})^0 + V(T_i^{XZ}, R_j^{XZ})^2}{V(T_i^{XZ}, R_j^{XZ})^0 - V(T_i^{XZ}, R_j^{XZdown})^0 - V(T_i^{XZ}, R_j^{XZ})^2}$ |

While having a combination of the coils in series implemented in hardware is desirable because of the simplicity of the electronics (fewer channels needed and absence of calibration), the coil pair measurements can also be acquired individually and a combination performed as part of an algorithm or software procedure.

transverse coils will provide the transverse (XX) propagation measurement. With this configuration, the axial and transverse attenuation and phase shift measurements can be generated according to the formulas below, where the transverse formula uses the DC terms ($\nabla$) but without the borehole compensated feature (discussed below). A similar formula may also be generated based on (XX−YY)/2. Note that in this case, the receiver channel gains need to be known.

$$ATT_{ZZ} \text{ and } PS_{ZZ} = \frac{GR_1^Z \cdot V(T_1^Z, R_1^Z)}{GR_2^Z \cdot V(T_1^Z, R_2^Z)}, \text{ and}$$

$$ATT_{XX} \text{ and } PS_{XX} = \frac{GR_1^X \cdot V(T_1^X, R_1^X)^0}{GR_2^X \cdot V(T_1^X, R_2^X)^0}.$$

where $^0$ stands for the DC term.

Figure 12:
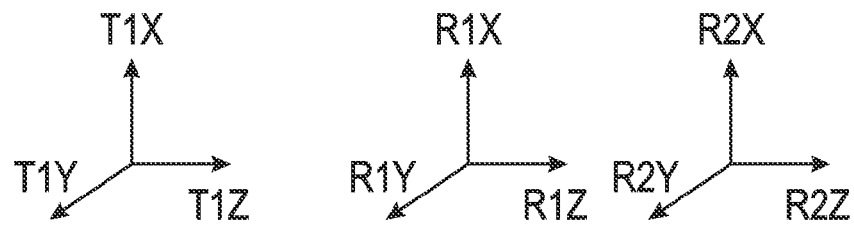
FIG. 12 is a magnetic dipole representation of an alternate exemplary embodiment of a single transmitter, two receiver, three-antenna group, in accordance with the present disclosure.

A three antenna group configuration is shown in FIG. 12 with T1X, T1Y, R1X, R1Y, and R2X, R2Y as transverse saddle coils and T1Z, R1Z, and R2Z as standard axial coils. Keeping the same angle between antennas, the axial coils will provide the standard ZZ coupling measurements while the transverse coils will provide the transverse (XX) and (YY) measurements. In this configuration, assuming calibrated measurements, the complete elementary coupling $Z_{T1R1}$ and $Z_{T1R2}$ can be measured and a generalized ratio $Z_{T1R1}/Z_{T1R2}$ can be constructed. This generalized ratio can also be computed with the XZ antenna system (explained above) when rotation is also used. Different combinations of coils in series (ZX, YZ, XY) can be used in a manner similar to the that described above to yield a similar measurement with the advantage of being calibrated.

Figure 13:
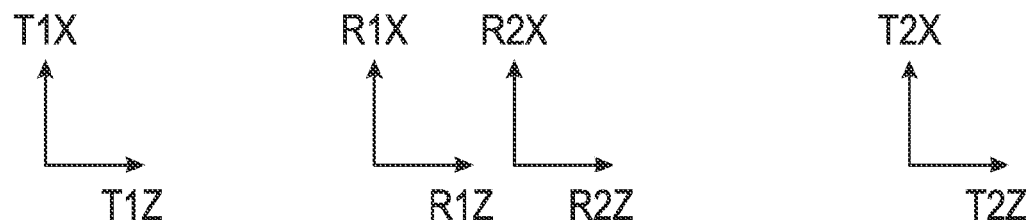
FIG. 13 is a magnetic dipole representation of an alternate exemplary embodiment of a dual transmitter, dual receiver, four-antenna group, in accordance with the present disclosure.
Figure 14:
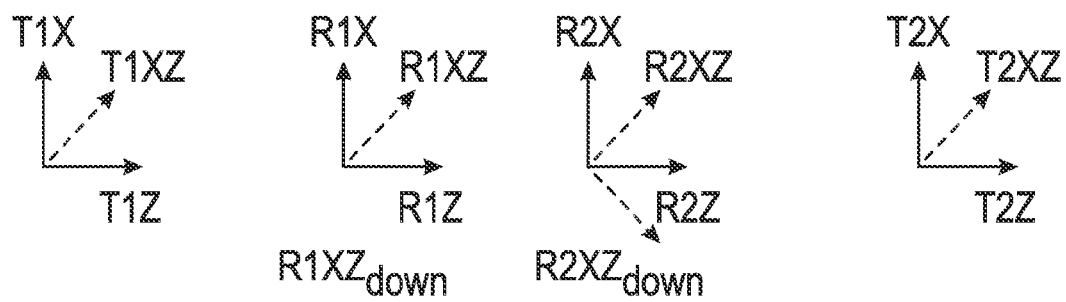
FIG. 14 is a magnetic dipole representation of an alternate exemplary embodiment of a dual transmitter, dual receiver, four-antenna group with coils wired in series, in accordance with the present disclosure.

An exemplary dual antenna configuration is shown in FIG. 13 with T1X, R1X, R2X, and T2X as transverse saddle coils and T1Z, R1Z, R2Z, and T2Z as standard axial coils. Keeping the same angle between antennas, the axial coils will provide the standard ZZ coupling propagation measurement while the transverse coils will provide the transverse propagation (XX) measurement. The co-located receiver antennas can also be wired in series to become a single tilted antenna (R1XZ and R2XZ). The corresponding series combination for the transmitter is possible but would require a third tuning circuitry to be added.

The axial and transverse borehole compensated attenuation and phase shift measurements can be generated according to the formulas where the transverse formula uses the DC terms ($\overline{V}$). A similar formula may also be generated based on (XX−YY)/2.

$$ATT_{ZZ} \text{ and } PS_{ZZ} = \frac{V(T_1^Z, R_1^Z)}{V(T_1^Z, R_2^Z)} \cdot \frac{V(T_2^Z, R_2^Z)}{V(T_2^Z, R_1^Z)}, \text{ and}$$

$$ATT_{XX} \text{ and } PS_{XX} = \frac{V(T_1^X, R_1^X)^0}{V(T_1^X, R_2^X)^0} \cdot \frac{V(T_2^X, R_2^X)^0}{V(T_2^X, R_1^X)^0}$$

where $^0$ stands for the DC term.

These measurements provide standard calibrated formation evaluation anisotropy measurements in both vertical and horizontal boreholes, but do not have any directionality. The axial borehole compensated measurement allows determination of the resistivity anisotropy when in high angle wells, but not in nearly vertical well (where high angle or nearly vertical well refers to the relative orientation of the anisotropy and the tool axis).

The four antenna group configuration can also be wired in a series in a similar way as described above. In such an implementation, the same axial and transverse borehole compensation measurement can be constructed, but with only half of the channels, as shown in Table 3.

TABLE 3

| Measurement type | Definition | Generation |
|---|---|---|
| Standard propagation axial | ATTzz, PSzz | BHC using $ZZ_{ij}$ = $V(T_i^{XZ}, R_j^{XZ})^0 + V(T_i^{XZ}, R_j^{XZdown})^0$ |
| Standard propagation transverse | ATTxx, PSxx | BHC using $\frac{XX_{ij} + YY_{ij}}{2} =$ $V(T_i^{XZ}, R_j^{XZ})^0 - V(T_i^{XZ}, R_j^{XZdown})^0$ |

Figure 15:
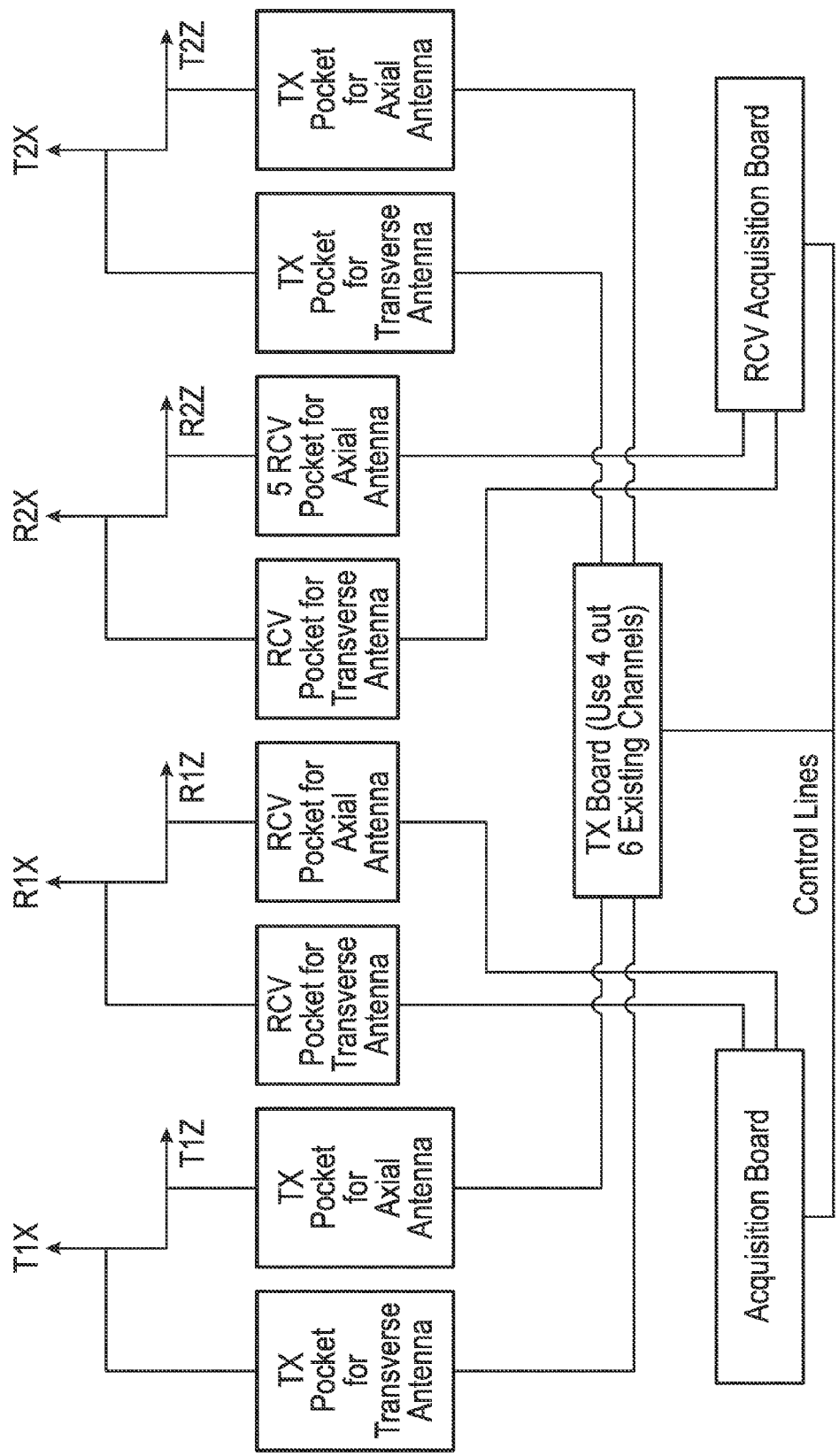
FIG. 15 is a schematic exemplary layout for a four-antenna group configuration, in accordance with the present disclosure.

The electronics impact for a transverse and axial implementation is shown in FIG. 15. The additional pockets and TX board would not change the TX sub chassis length significantly. Note also that implementing the transverse axial series configuration reduces by half the number of pockets.

Figure 16:
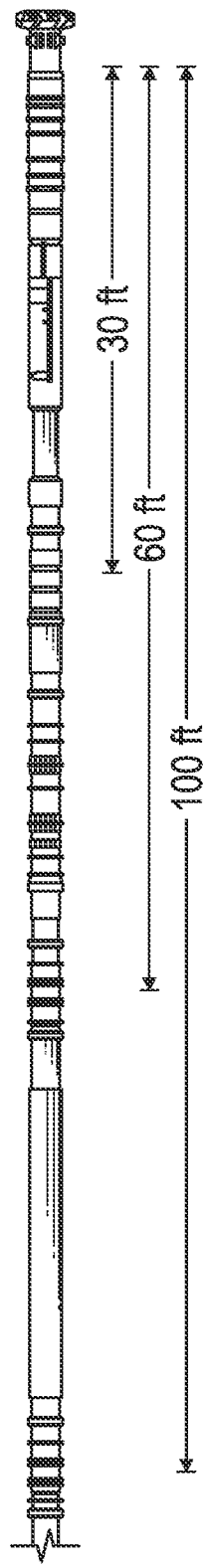
FIG. 16 shows an exemplary bottomhole assembly, in accordance with the present disclosure.
Figure 17:
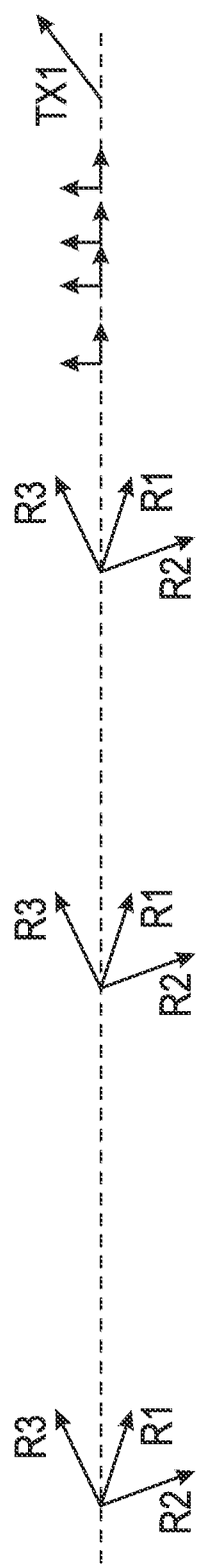
FIG. 17 shows tilted antenna magnetic moment orientations corresponding to the bottomhole assembly of FIG. 16.
Figure 18:
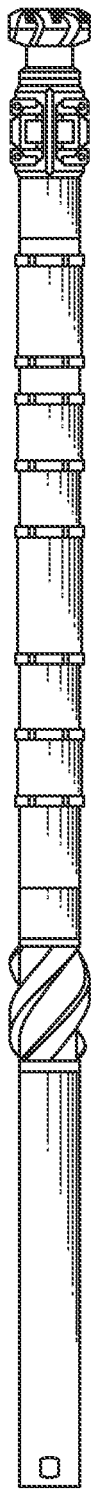
FIG. 18 shows an exemplary bottomhole assembly, in accordance with the present disclosure.

The bottomhole assembly (BHA) shown, for example, in FIG. 16 is an embodiment of the antenna configuration discussed above. In this BHA, tilted antennas provide a measurement with a deep depth of investigation to sense the resistivity and boundary using the resistivity contrast of the formation around and ahead of the bit. The antenna system allows a look-around and look-ahead with the location of the TX coil as close to the bit as possible. The saddle/axial co-located antennas close to the bit provide a shallow directional resistivity measurement. FIG. 17 shows corresponding tilted antenna magnetic moment orientations. The tilted receivers can be co-located, but are not required to be co-located. The shallow saddle/axial coil system is shown immediately above the tilted transmitter. FIG. 18 shows an example of an implementation in a collar close to the bit with a four-antenna group (for borehole compensation). Note that the last antenna is a standard tilted antenna.

Figure 19:
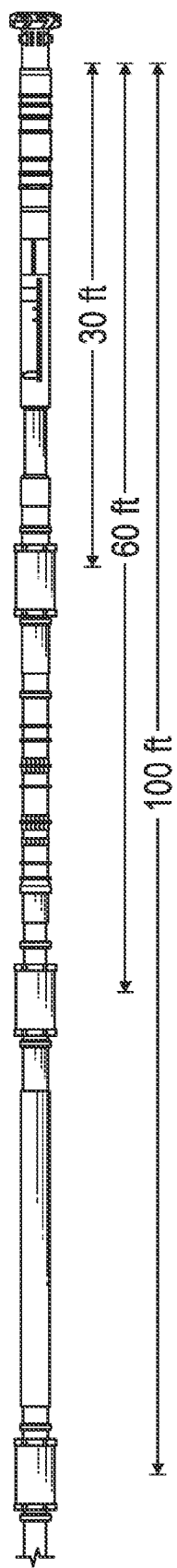
FIG. 19 shows an alternative exemplary bottomhole assembly, in accordance with the present disclosure.
Figure 20:
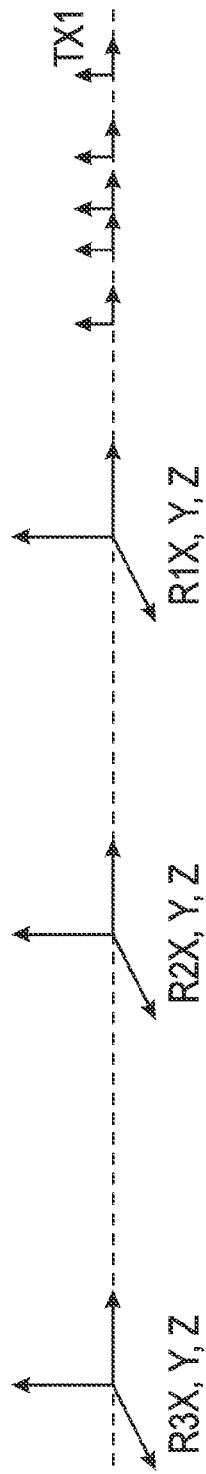
FIG. 20 shows antenna magnetic moment orientations corresponding to the bottomhole assembly of FIG. 19.
Figure 21:
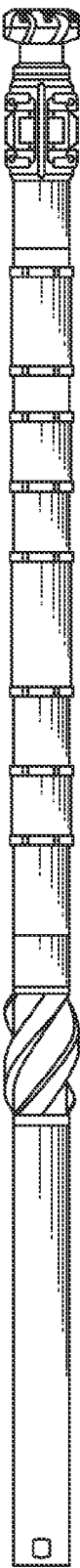
FIG. 21 shows an exemplary implementation of a measurement device in a collar close to the bit with a four-antenna group (for borehole compensation), in accordance with the present disclosure.
Figure 22:
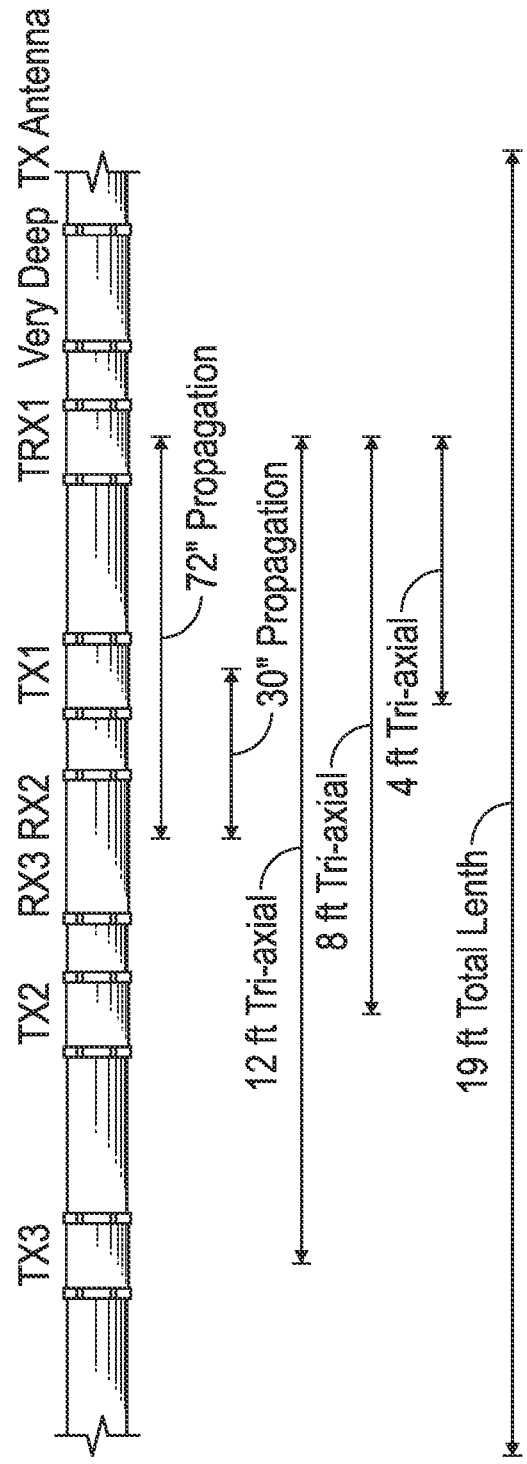
FIG. 22 shows an alternate implementation of a shallow saddle/axial coil system with a combination of propagation formation evaluation measurements and multiple two antenna tri-axial systems with different depths of investigation for deeper dip and formation evaluation anisotropy measurements, in accordance with the present disclosure.

The BHA shown in the FIG. 19 is an alternate embodiment of the antenna configuration discussed above. In this embodiment, saddle/axial co-located antennas provide a measurement with a deep depth of investigation to sense the resistivity and boundary using the resistivity contrast of the formation around and ahead of the bit. As before, the saddle/axial co-located antennas close to the bit provide an FE shallow directional resistivity. The corresponding saddle/axial co-located antenna magnetic moment orientation are shown in FIG. 20. The transmitter may be a tilted coil or a saddle/axial co-located coil system (driven in series or individually driven). The shallow saddle/axial coil system is shown immediately above the tilted transmitter in this system. FIG. 21 shows an example of an implementation in a collar close to the bit with a four-antenna group (for borehole compensation). Note that the last antenna close to the bit is also a saddle/axial co-located antenna system instead of a standard tilted antenna (used for deep measurements). FIG. 22 shows another possible implementation of a shallow saddle/axial coil system with a combination of propagation formation evaluation measurements and multiple two antenna tri-axial systems with different depths of investigation for deeper dip and formation evaluation anisotropy measurements.

A shallow resistivity measurement close to the bit significantly enhances the results of a look-ahead inversion. In this inversion, by using the look-around capability (i.e., by using shallower measurements), the look-ahead is improved since the measurement sensitivity is mostly look-around with some look-ahead. The look-ahead allows for resistivity profile (ramp) estimation and detection of an oil-water contact (OWC). A longer spacing (e.g., 100 ft) combined with shallow resistivity close to the bit offers the best sensitivity to ramp and OWC ahead of the bit. The look-ahead also allows for detection of a thin layer ahead of the bit.

A study was conducted using the parametric inversion looking at the effect of knowing the anisotropy of the formation (shallow resistivity sensor measuring anisotropy) versus not knowing the anisotropy. The general consensus is that the answer product with an anisotropic shallow resistivity measurement is qualitatively better, but not significantly better. Typically, the anisotropy of the upper layers is solved as an overall anisotropy. It is expected that instead of using an overall anisotropy, the inversion will be improved when including the anisotropy information found below the resistivity sensor measure point at a previous measurement depth.

Figure 23:
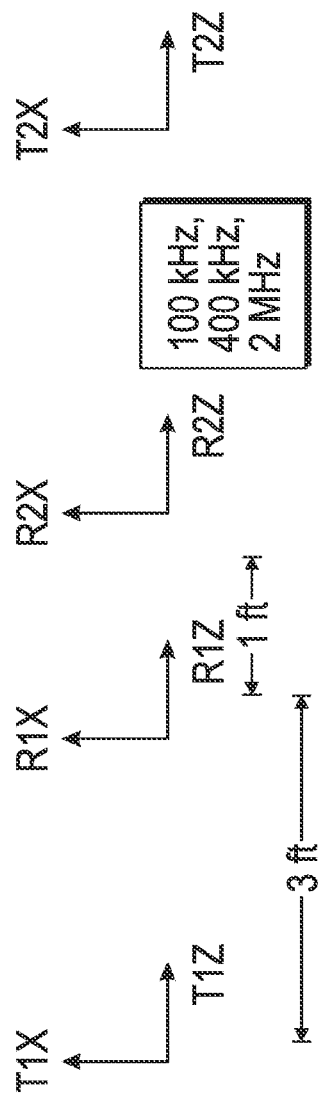
FIG. 23 show the antenna configuration used for simulation purposes, in accordance with the present disclosure.
Figure 24:
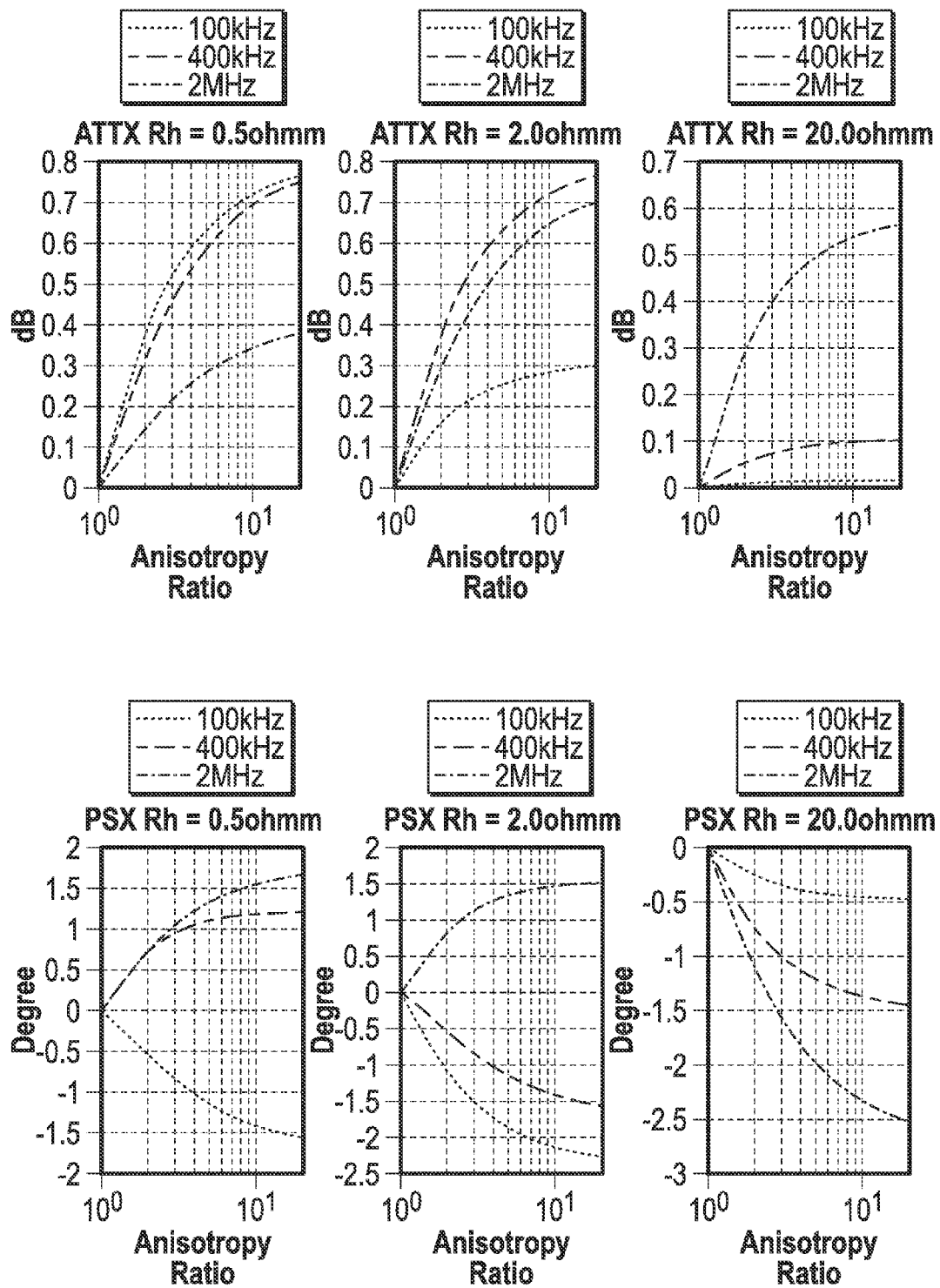
FIG. 24 is a set of plots showing the attenuation and phase shift for a borehole compensated transverse propagation measurement with an R1-R2 distance of 1 ft and TX spacing of 3 ft (Dip=0), in accordance with the present disclosure.
Figure 25:
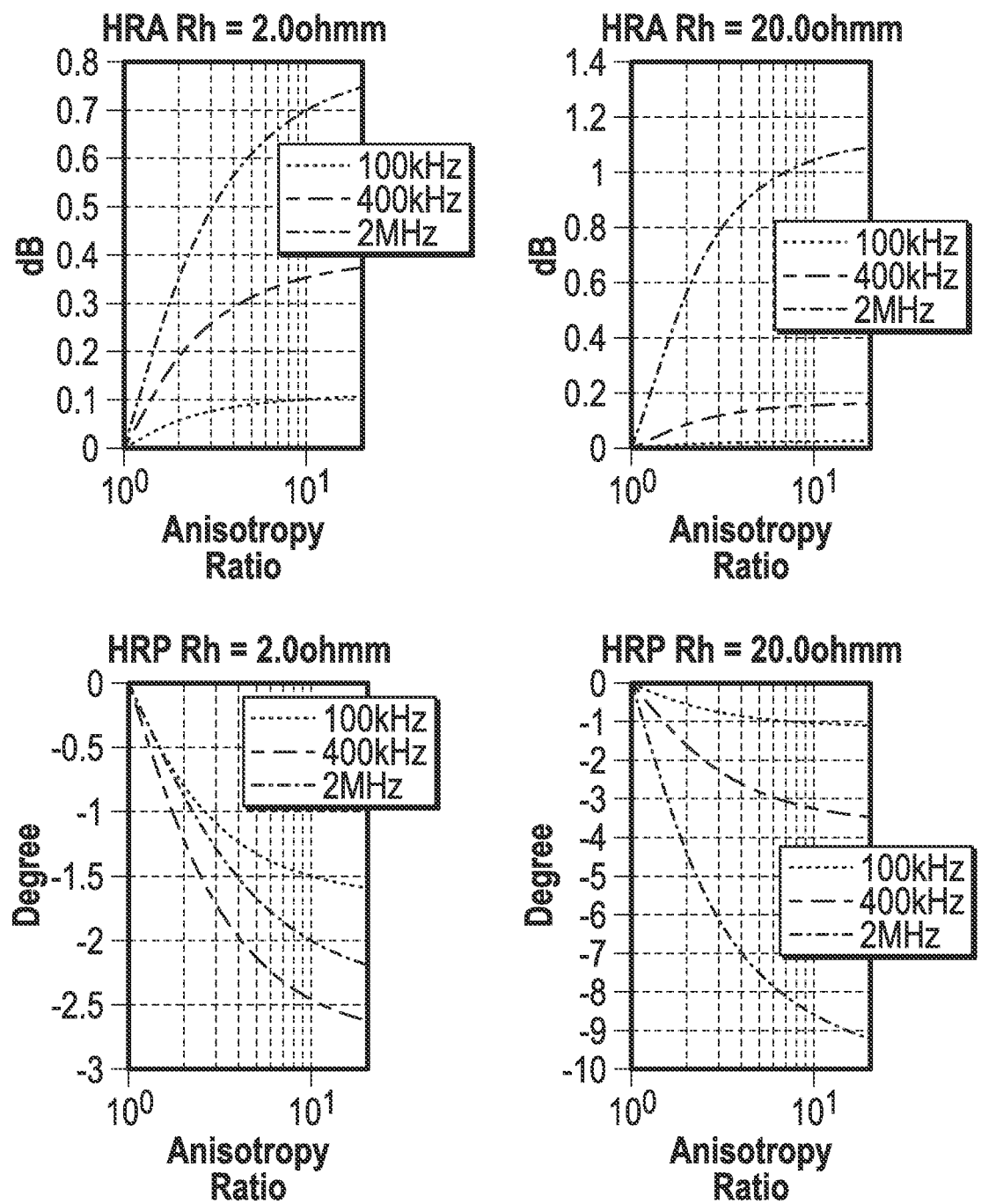
FIG. 25 is a set of plots showing the harmonic anisotropy measurement (two coils) with 2.5 ft spacing (Dip=0), in accordance with the present disclosure.

For simulation purposes, the antenna configuration shown in FIG. 23 was used. All measurements are shown relative to an isotropic formation. The sensitivity to resolution for the transverse propagations and the harmonic anisotropy resistivity channel HRA, P=Z/(XX+YY)/2 are shown in FIG. 24 and FIG. 25, respectively, for a zero dip situation. The HRA and HRP plots have a better resolution as function of anisotropy, but the accuracy of that measurement is expected to be lower than the standard propagation measurement. In addition, the dependence with respect to anisotropy and dip may not necessarily be a single value, unlike the HRA and HRP measurements. In both measurements, the overall spread of the different dip curves as function of anisotropy allows one to discriminate and isolate the anisotropy and dip effect. At higher resistivity, the anisotropy dependence is rather weak.

Figure 26:
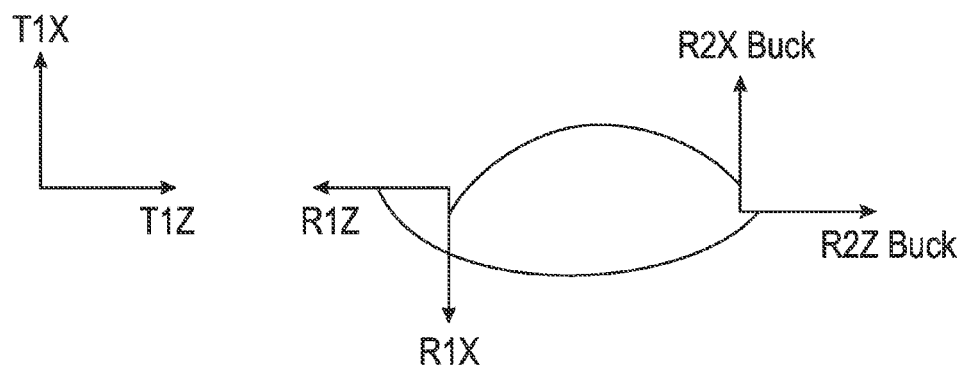
FIG. 26 shows a dual antenna induction configuration, in accordance with the present disclosure.
Figure 27:
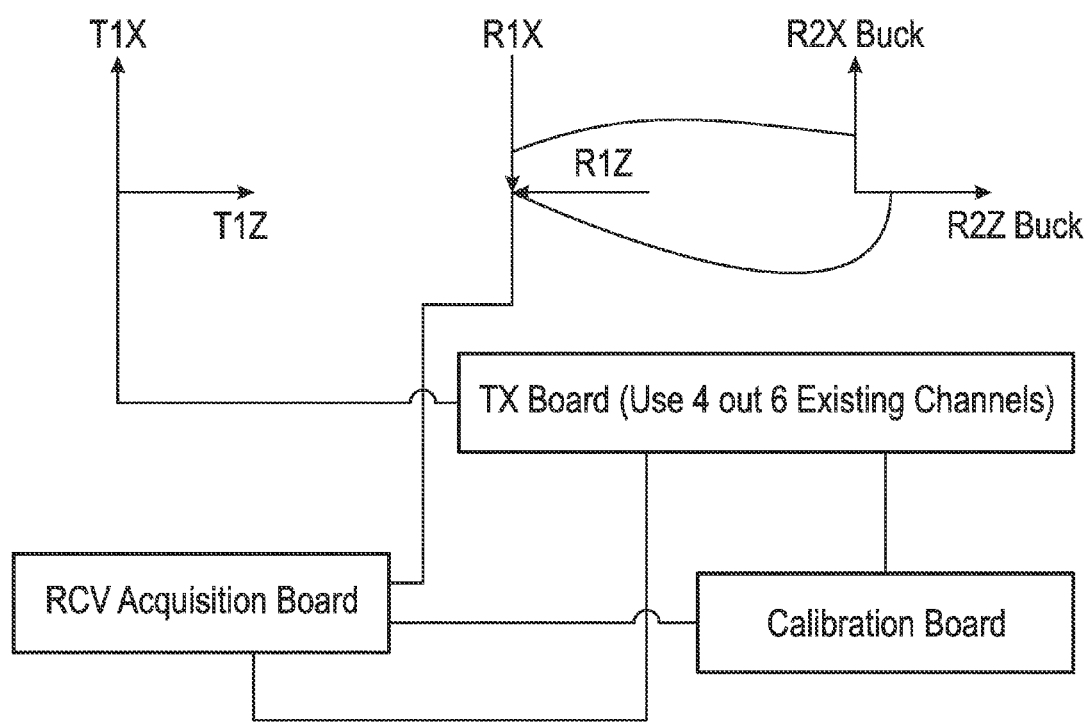
FIG. 27 shows an exemplary electronics layout for the induction type measurement device of FIG. 26.

A dual antenna induction configuration is shown in FIG. 26 with T1X, R1X, R2X, and T2X as transverse saddle coils and T1Z, R1Z, R2Z, and T2Z as standard axial coils. In this implementation, the receiver coils are connected in series so as to eliminate the direct coupling from the transmitter and yield a dependence nearly linear with respect to conductivity. In one embodiment, the electronics for a triaxial induction implementation will need a current drive transmitter board, a receiver board, and a calibration board, as shown in FIG. 27.

We can measure the apparent conductivity tensor $\sigma_{app}^k$ for the k-th spacing and invert a 1D-dipping layered earth model for the Rh_k, Rv_k, dip_k, azi_k, or bed thickness. This is symbolically shown by:

$$\sigma_{app}^k = \begin{pmatrix} \sigma_{xx} & \sigma_{xy} & \sigma_{xz} \\ \sigma_{yx} & \sigma_{yy} & \sigma_{yz} \\ \sigma_{zx} & \sigma_{zy} & \sigma_{zz} \end{pmatrix} \rightarrow \text{Inversion}(R_h, R_v, dip, azi, h).$$

The calibration of the triaxial or tensor resistivity tool can be shown for the i-th transmitter, the j-th receiver, and the k-th spacing functionally as:

$$\sigma_{ijk}^{app} = g^{elec}(T_e) g_{ijk}^{TTL}(\sigma_{ijk}^{meas} - \sigma_{ijk}^{SEC}(T_a)).$$

where $\sigma_{ijk}^{app}$ is the calibrated-complex apparent-conductivity and $g_{ijk}^{TTL}$ is the gain correction defined for a modeled reference tilted test loop and given by:

$$g_{ij}^{TTL} = \frac{|\sigma_{ijk}^{TTL_{Ref}}|}{|\sigma_{ijk}^{TTL_{Meas}}|}.$$

The background correction $\sigma_{ijk}^{SEC}(T)$ is given by:

$$\sigma_{ijk}^{SEC}(T) = \frac{\eta_{jk}}{K_{ijk}} \frac{V_{jk}^{SEC}}{I_i}.$$

Figure 28:
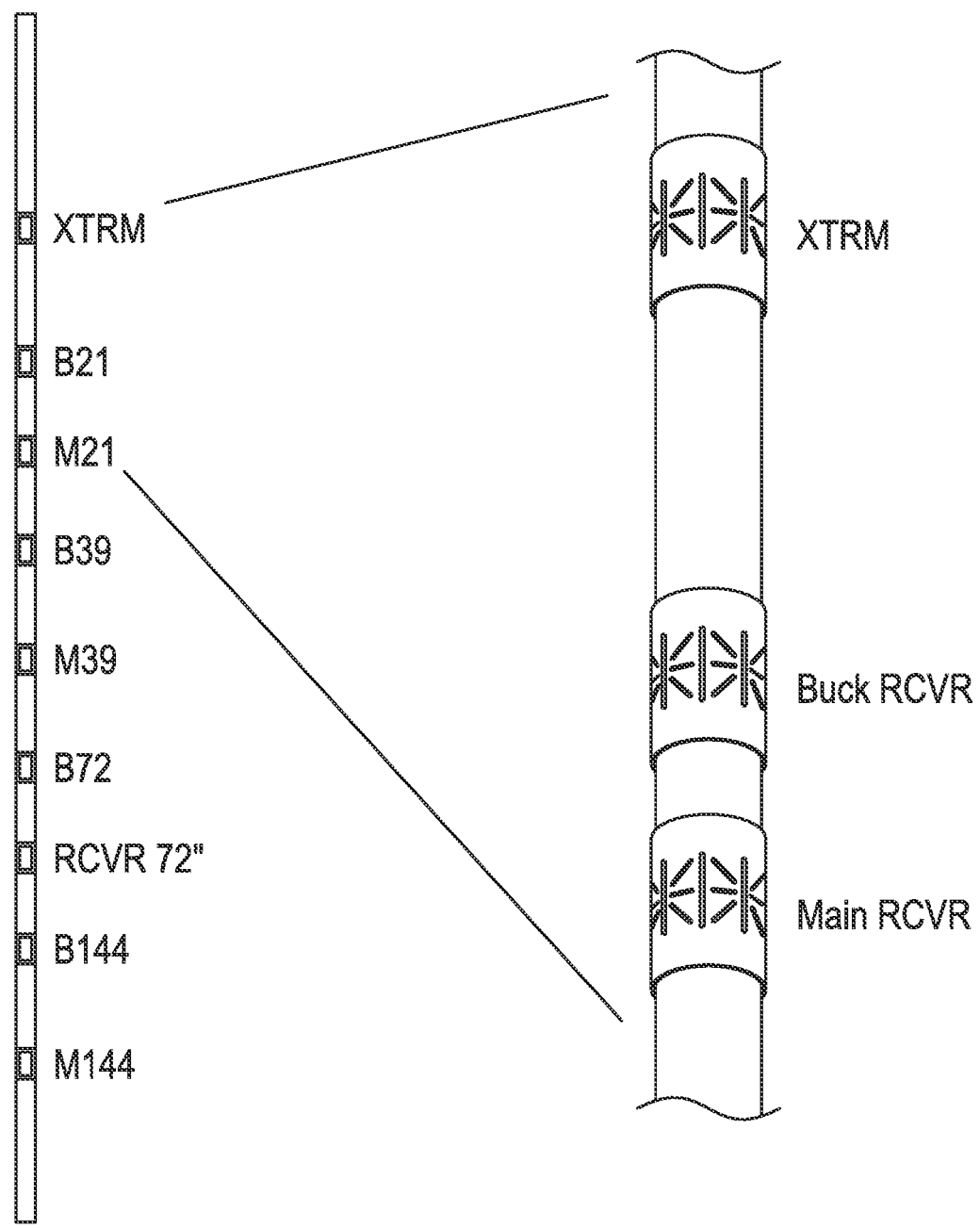
FIG. 28 shows an exemplary LWD tenser resistivity tool, in accordance with the present disclosure.
Figure 29:
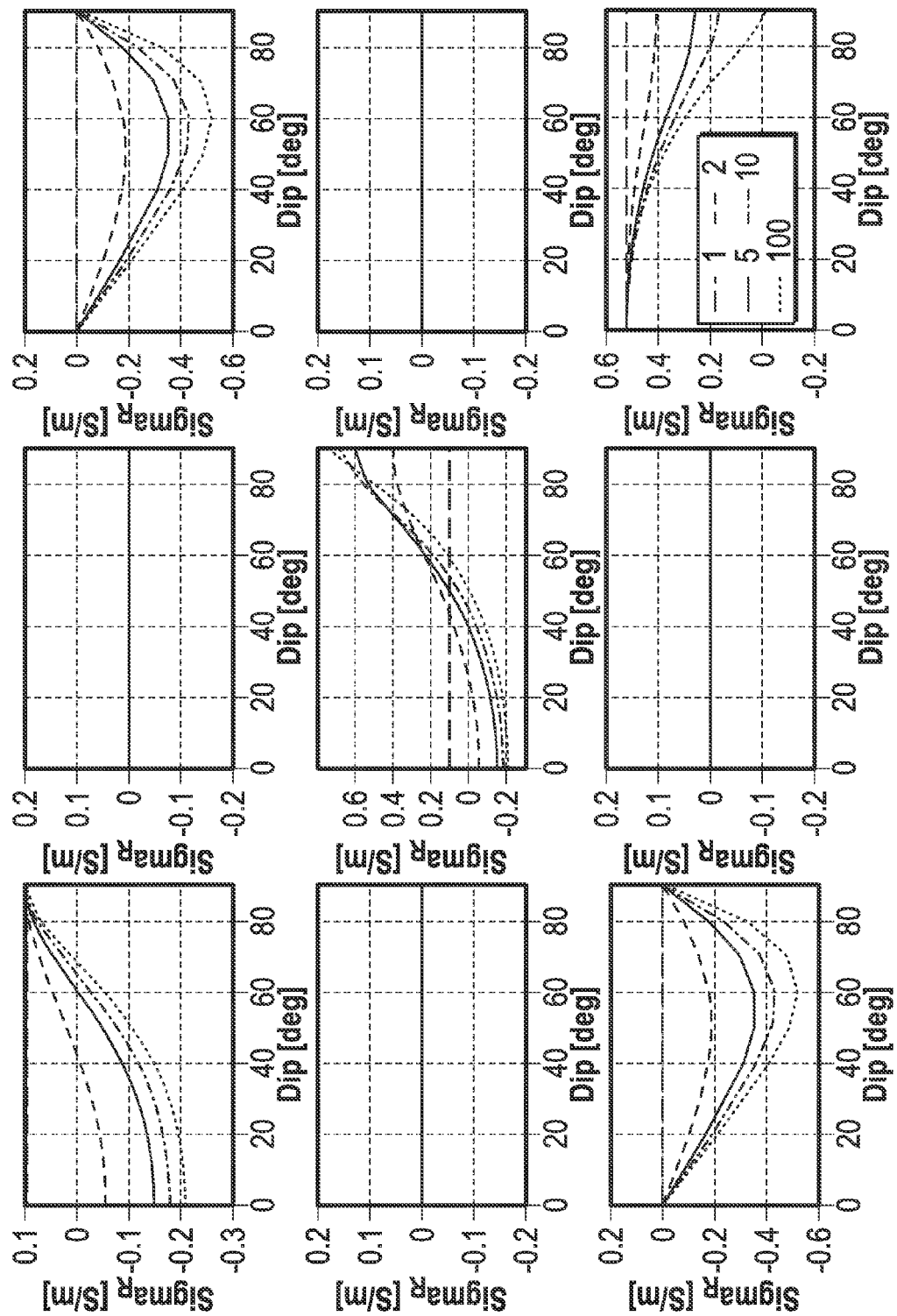
FIG. 29 shows an exemplary tool response to a zero azimuth formation versus dip and anisotropy, in accordance with the present disclosure.

An embodiment of an LWD tenser resistivity tool is shown in FIG. 28. A typical tool response to a zero azimuth formation versus dip and anisotropy is shown in FIG. 29.

For completeness the elementary coupling formula as function of rotation is shown below.

$$\text{Rotation of elementary coupling meatrix } M(\phi)$$

$$M(\phi) = \begin{bmatrix} \cos\phi & \sin\phi & 0 \\ -\sin\phi & \cos\phi & 0 \\ 0 & 0 & 1 \end{bmatrix} \cdot \begin{bmatrix} XX & XY & XZ \\ YX & YY & YZ \\ ZX & ZY & ZZ \end{bmatrix} \cdot \begin{bmatrix} \cos\phi & -\sin\phi & 0 \\ \sin\phi & \cos\phi & 0 \\ 0 & 0 & 1 \end{bmatrix}$$

$$= \begin{bmatrix} \cos\phi & \sin\phi & 0 \\ -\sin\phi & \cos\phi & 0 \\ 0 & 0 & 1 \end{bmatrix} \cdot$$

$$\begin{bmatrix} \cos\phi \cdot XX + \sin\phi \cdot XY & -\sin\phi \cdot XX + \cos\phi \cdot XY & XZ \\ \cos\phi \cdot YX + \sin\phi \cdot YY & -\sin\phi \cdot YX + \cos\phi \cdot YY & YZ \\ \cos\phi \cdot ZX + \sin\phi \cdot ZY & -\sin\phi \cdot ZX + \cos\phi \cdot ZY & ZZ \end{bmatrix}$$

$$= \begin{bmatrix} \cos^2\phi \cdot XX + \sin\phi \cdot \cos\phi \cdot XY + \sin\phi \cdot \cos\phi \cdot YX + \sin^2\phi \cdot YY & -\sin\phi \cdot \cos\phi \cdot XX + \cos^2\phi \cdot XY - \sin^2\phi \cdot YX + \sin\phi \cdot \cos\phi \cdot YY & \cos\phi \cdot XZ + \sin\phi \cdot YZ \\ -\sin\phi \cdot \cos\phi \cdot XX - \sin^2\phi \cdot XY + \cos^2\phi \cdot YX + \sin\phi \cdot \cos\phi \cdot YY & \sin^2\phi \cdot XX - \sin\phi \cdot \cos\phi \cdot XY - \sin\phi \cdot \cos\phi \cdot YX + \cos^2\phi \cdot YY & -\sin\phi \cdot XZ + \cos\phi \cdot YZ \\ \cos\phi \cdot ZX + \sin\phi \cdot ZY & -\sin\phi \cdot ZX + \cos\phi \cdot ZY & ZZ \end{bmatrix}$$

with $$\cos^2\phi = \frac{1}{2} \cdot (1 + \cos 2\phi),$$

$$\sin^2\phi = \frac{1}{2} \cdot (1 - \cos 2\varphi),$$

$$\sin\phi \cdot \cos\phi = \frac{1}{2} \cdot \sin 2\phi$$

and the receiver voltage is given by:

$$V(\phi) = m_T^t M(\phi) m_R,$$

where $m_T^t$ and $m_R$ are the transmitter and receiver vector moments, respectively.

It should be appreciated that while the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to determine a formation property of a subsurface formation, comprising:
   providing a downhole logging tool having two or more antennas, wherein at least one of the two or more antennas is a multi-axial antenna comprising:
   a first transverse antenna component arranged as a first pair of diametrically opposed saddle coils having a transversely-sensitive element that is sensitive in a direction transverse to a longitudinal axis of the downhole logging tool, wherein the first transverse antenna component has a dipole moment that is substantially perpendicular to the longitudinal axis; and
   an axial antenna component arranged as a coil wound around a body of the downhole logging tool and having an axially-sensitive element that is sensitive in the direction of the longitudinal axis, wherein the axial antenna component has a dipole moment that is substantially parallel to the longitudinal axis;

obtaining azimuthally-sensitive measurements using the antennas of the downhole logging tool;

fitting the measurement to a Fourier series having Fourier coefficients that include channel gains;

determining a DC component, a first harmonic component, and a second harmonic component from the Fourier series;

determining a measurement type using at least one of the DC component, the measurement type comprising at least one of symmetrized cross-component measurements, anti-symmetrized cross component measurements, resistivity harmonic measurements and resistivity anisotropy; and determining the formation property of the subsurface information using the determined measurement type, wherein the DC component is directly proportional to (XX+YY)/2, and wherein X is representative of a transverse axis and Y is representative of an axis perpendicular to the transverse axis.

2. The method of claim 1, wherein the first transverse antenna component and the axial antenna component are co-located.

3. The method of claim 1, wherein the downhole tool further comprises a substantially electromagnetically transparent slotted conductive shield or a substantially electromagnetically transparent non-conductive shield.

4. The method of claim 1, wherein the obtaining azimuthally-sensitive measurements comprises transmitting and receiving an electromagnetic signal transmitted at a frequency, or transmitting and receiving a plurality of electromagnetic signals, each of the electromagnetic signals being transmitted at different frequencies.

5. The method of claim 1, wherein the azimuthally-sensitive measurements are obtained while the downhole logging tool is rotating or sliding.

6. The method of claim 1, wherein the transversely-sensitive element of a particular antenna is wired in series with the axially-sensitive element of the particular antenna and a double throw, double switch relay to produce a combined coil, and further comprising switching the direction of the combined coil magnetic moment azimuthally by 180 degrees.

7. The method of claim 1, further comprising performing borehole compensation on the measurements.

8. The method of claim 1, further comprising using the determined formation property for at least one of well placement, formation evaluation, or look-ahead, look-around operations.

9. A method of claim 1, wherein the multi-axial antenna is a triaxial antenna additionally comprising:

a second transverse antenna component arranged as a second pair of diametrically opposed saddle coils having a transversely sensitive element that is sensitive in a direction transverse to the longitudinal axis of the downhole logging tool, wherein the second transverse antenna component of the triaxial antenna has a dipole moment that is substantially perpendicular to the longitudinal axis and also substantially perpendicular to the dipole moment of the first transverse antenna component.

10. The method of claim 9, wherein the saddle coils of the first transverse antenna component are azimuthally offset from the saddle coils of the second transverse antenna component.

11. The method of claim 9, wherein the axial component, the first transverse antenna component, and the second transverse antenna component of the triaxial antenna are co-located.

12. A system to determine a formation property of a subsurface formation, comprising:

a downhole logging tool having two or more antennas, wherein at least one of the two or more antennas is a multi-axial antenna comprising:

a first transverse antenna component arranged as a first pair of diametrically opposed saddle coils having a transversely-sensitive element that is sensitive in a direction transverse to a longitudinal axis of the downhole logging tool, wherein the first transverse antenna component has a dipole moment that is substantially perpendicular to the longitudinal axis; and an axial antenna component arranged as a coil wound around a body of the downhole logging tool and having an axially-sensitive element that is sensitive in the direction of the longitudinal axis, wherein the axial antenna component has a dipole moment that is substantially parallel to the longitudinal axis; and a processor for obtaining azimuthally-sensitive measurements using the antennas of the downhole logging tool;

fitting the measurements to a Fourier series having Fourier coefficients that include channel gains;

determining a DC component, a first harmonic component, and a second harmonic component from the Fourier series;

determining a measurement type using at least one of the DC component, the measurement type comprising at least one f symmetrized cross-component measurements, anti-symmetrized cross component measurements, resistivity harmonic measurements and resistivity anisotropy; and determining the formation property of the subsurface information using the determine measurement type, wherein the DC component is directly proportional to (XX+YY)/2, and wherein X is representative of a transverse axis and Y is representative of an axis perpendicular to the transverse axis.

13. The system of claim 12, wherein the downhole logging tool is disposed on a wireline, a drill string, or a wired drill pipe.

14. The system of claim 12, wherein the first transverse antenna component and the axial antenna component are co-located.

15. The system of claim 12, wherein the downhole tool further comprises a substantially electromagnetically transparent slotted conductive shield or a substantially electromagnetically transparent non-conductive shield.

16. The system of claim 12, wherein the multi-axial antenna is a triaxial antenna additionally comprising:

a second transverse antenna component arranged as a second pair of diametrically opposed saddle coils having a transversely sensitive element that is sensitive in a direction transverse to the longitudinal axis of the downhole logging tool, wherein the second transverse antenna component of the triaxial antenna has a dipole moment that is substantially perpendicular to the longitudinal axis and also substantially perpendicular to the dipole moment of the first transverse antenna component.

17. The system of claim 16, wherein the saddle coils of the first transverse antenna component are azimuthally offset from the saddle coils of the second transverse antenna component.

18. The system of claim 16, wherein the axial antenna component, the first transverse antenna component, and the second transverse antenna component of the triaxial antenna are co-located.

* * * * *